United States Patent
Okuma et al.

(10) Patent No.: US 11,001,181 B2
(45) Date of Patent: May 11, 2021

(54) VEHICLE SEAT HAVING SEAT BACK FRAME

(71) Applicants: TS TECH CO., LTD., Asaka (JP); HONDA MOTOR CO., LTD., Tokyo (JP)

(72) Inventors: Kei Okuma, Shioya-gun (JP); Naoya Nishimoto, Shioya-gun (JP); Hisato Oku, Wako (JP); Shingo Baba, Wako (JP)

(73) Assignees: TS TECH CO., LTD., Asaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/496,472

(22) PCT Filed: Mar. 20, 2018

(86) PCT No.: PCT/JP2018/010965
§ 371 (c)(1),
(2) Date: Sep. 23, 2019

(87) PCT Pub. No.: WO2018/174043
PCT Pub. Date: Sep. 27, 2018

(65) Prior Publication Data
US 2020/0010003 A1    Jan. 9, 2020

(30) Foreign Application Priority Data
Mar. 23, 2017    (JP) .............................. JP2017-056949

(51) Int. Cl.
*B60N 2/897*    (2018.01)
*B60N 2/68*    (2006.01)
(Continued)

(52) U.S. Cl.
CPC ............. *B60N 2/897* (2018.02); *B60N 2/682* (2013.01); *B60N 2/686* (2013.01); *B60N 2/809* (2018.02);
(Continued)

(58) Field of Classification Search
CPC .. B60N 2/686; B60N 2002/899; B60N 2/682; B60N 2/809; B60N 2/897
See application file for complete search history.

(56) References Cited

U.S. PATENT DOCUMENTS 5,445,434 A * 8/1995 Kohut .................... B60N 2/826
                                                          297/391
7,673,944 B2 * 3/2010 Behrens ................... B60N 2/68
                                                          297/452.18
(Continued)

FOREIGN PATENT DOCUMENTS

| JP | 2001-61593 A | 3/2001 |
|---|---|---|
| JP | 2011-105050 A | 6/2011 |

(Continued)

OTHER PUBLICATIONS

Sep. 24, 2019 International Preliminary Report on Patentability issued in International Patent Application No. PCT/JP2018/010965.
(Continued)

*Primary Examiner* — Milton Nelson, Jr.
(74) *Attorney, Agent, or Firm* — Oliff PLC

(57) ABSTRACT

A vehicle seat including a seat back in which a seat back frame that is a flat plate is provided, wherein a reinforcement portion is provided to a surface of the seat back frame, the surface requiring reinforcement, and the reinforcement portion protruding in a shape of a line along the surface requiring the reinforcement from the surface requiring the reinforcement, and at least a part of the reinforcement portion is a stepped portion that is provided to continue from
(Continued)

the other portion of the reinforcement portion and has a protruding height lower than a protruding height of the other portion, the protruding height being a height from the surface requiring the reinforcement.

15 Claims, 6 Drawing Sheets

(51) Int. Cl.
    *B60N 2/809*      (2018.01)
    *B60N 2/80*      (2018.01)
    *B60N 2/882*      (2018.01)

(52) U.S. Cl.
    CPC ........ *B60N 2/882* (2018.02); *B60N 2002/899* (2018.02)

(56) References Cited

U.S. PATENT DOCUMENTS

| | | | |
|---|---|---|---|
| 8,998,316 B2 * | 4/2015 | Naughton | B60N 2/4214 297/216.13 |
| 10,160,359 B2 * | 12/2018 | Tomita | B60N 2/36 |
| 2003/0062759 A1 * | 4/2003 | Gupta | B60N 3/02 297/452.65 |
| 2008/0006002 A1 * | 1/2008 | Strickland | E04C 3/09 52/843 |
| 2011/0127823 A1 * | 6/2011 | Behrens | B60N 2/686 297/452.55 |
| 2016/0368406 A1 * | 12/2016 | Pluta | B60N 2/64 |

FOREIGN PATENT DOCUMENTS

| | | |
|---|---|---|
| JP | 2011-168109 A | 9/2011 |
| JP | 2014-19316 A | 2/2014 |
| JP | 2014-34245 A | 2/2014 |

OTHER PUBLICATIONS

May 29, 2018 International Search Report issued in International Patent Application No. PCT/JP2018/010965.

* cited by examiner

VEHICLE SEAT HAVING SEAT BACK FRAME

TECHNICAL FIELD

The present invention relates to a vehicle seat including a seat back in which a seat back frame of a flat plate is provided.

BACKGROUND ART

As a seat for a vehicle (especially, a car), there is a seat including a seat cushion which supports buttocks of a passenger, a seat back which is provided at the rear end of the seat cushion, and a head rest which is attached to the upper portion of the seat back.

The head rest includes a head rest main body which contacts a head of the passenger, and rod-like pillars which protrude from the main body. The general head rest is attached to the seat back by inserting the pillars into insertion holes provided in the upper portion of the seat back.

The seat back includes a seat back frame which has a panel material formed of a metallic plate and a frame material joined to the panel material, and a pad which covers the seat back frame, in many cases.

Since the seat back frame is required to have a certain stiffness or more, conventionally, a predetermined stiffness or more has been provided to the seat back frame by forming a reinforcement portion (beads) which is the panel material bulging in a shape of lines in the region to which the frame material is not joined in the panel material (see Patent Documents 1 and 2).

CITATION LIST

Patent Literature

Patent Document 1: JP 2014-034245A
Patent Document 2: JP 2014-019316A

SUMMARY OF INVENTION

Technical Problem

In a seat for a vehicle including the seat back as described in the patent documents 1 and 2, the ends of pillars of the head rest inserted into the insertion holes in the seat back contact the reinforcement portion of the seat back frame in the seat back in some cases. When the vehicle moves with the pillars contacting the reinforcement portion, the ends of the pillars repeatedly separate from and collide with the reinforcement portion and rub due to the vibration, and thus the noise is generated. Such noise possibly makes the passenger feel unpleasant.

In order to prevent such a contact between the pillars and the reinforcement portion, there can be considered measures of not forming the reinforcement portion on the extended lines of the pillars and of arranging the pillars such that the reinforcement portion is not located on the extended lines of the pillars.

However, if the reinforcement portion is not formed on the extended lines of the pillars, the portions requiring reinforcement are not sufficiently reinforced, and the stiffness of the panel material possibly becomes lower than the required stiffness. The reduced amount of stiffness needs to be compensated by providing another reinforcement member, leading to the increase in size and weight of the seat.

On the other hand, if the pillars are arranged such that the reinforcement portion is not located on the extended lines of the pillars, the forming positions and the angles of the insertion holes of the pillars are limited, that is, the freedom degree of the seat design is lowered. If the formation of the insertion holes is limited, the designing of the members forming the head rest and the insertion holes of the pillars is troublesome and the size of the seat back needs to be increased in order to have a distance between the pillars and the reinforcement portion.

The present invention has been made in consideration of the above problems, and an object of the present invention is to avoid spoiling the high freedom degree of the design while having the necessary stiffness in the seat back frame when there is a member to be inserted into the seat back.

Solution to Problem

In order to solve the above problems, a first aspect of the invention is a vehicle seat including a seat back in which a seat back frame that is a flat plate is provided, in which a reinforcement portion is provided to a surface of the seat back frame, the surface requiring reinforcement, and the reinforcement portion protruding in a shape of a line along the surface requiring the reinforcement from the surface requiring the reinforcement, and at least a part of the reinforcement portion is a stepped portion that is provided to continue from the other portion of the reinforcement portion and has a protruding height lower than a protruding height of the other portion, the protruding height being a height from the surface requiring the reinforcement.

A second aspect of the invention is the vehicle seat of the first aspect, in which a shape of the reinforcement portion having the stepped portion is circular when the reinforcement portion is seen from a direction orthogonal to the surface requiring the reinforcement.

A third aspect of the invention is the vehicle seat of the first aspect, in which a plurality of the stepped portions is provided.

A fourth aspect of the invention is the vehicle seat of the first aspect, including a head rest that has a main body and a pillar in a shape of a rod protruding from the main body, in which a pillar supporting portion that supports the pillar is provided to the surface requiring the reinforcement, and the stepped portion is provided at a position facing an end of the pillar supported by the pillar supporting portion.

A fifth aspect of the invention is the vehicle seat of the fourth aspect, in which the pillar supporting portion is a cylinder in which the pillar is inserted, a length of the stepped portion in an extending direction of the reinforcement portion is longer than a thickness of the pillar, and both ends of the stepped portion in the extending direction of the reinforcement portion are provided on respective sides farther away from a central axis of the pillar than lateral surfaces of the pillar supported by the pillar supporting portion.

A sixth aspect of the invention is the vehicle seat of the fourth aspect, in which a width of the stepped portion in an extending direction of the reinforcement portion is substantially equal to a width of the pillar supporting portion in the extending direction of the reinforcement portion.

A seventh aspect of the invention is the vehicle seat of the fifth aspect, in which the reinforcement portion and the stepped portion are provided to extend in a horizontal direction, the pillar supporting portion is provided above the stepped portion, and a width of the stepped portion in a direction orthogonal to an extending direction of the stepped portion and the protruding direction is thinner than a width of the other portion, and an upper end of the stepped portion is located lower than an upper end of the other portion.

An eighth aspect of the invention is the vehicle seat of the first aspect, in which, near the reinforcement portion having the stepped portion, another reinforcement portion not having the stepped portion is provided to extend in parallel with the reinforcement portion.

A ninth aspect of the invention is the vehicle seat of the first aspect, in which, inside the seat back, the seat back frame is arranged in substantially parallel with a surface of the seat back, the surface contacting a back of a passenger, and the reinforcement portion is provided to protrude toward a side where the surface contacting the back of the passenger exists.

A tenth aspect of the invention is the vehicle seat of the first aspect, in which the reinforcement portion is a bead that is a bulging part of the seat back frame.

An eleventh aspect of the invention is the vehicle seat of the first aspect, in which a frame material in a shape of a rod extending along the surface requiring the reinforcement is provided to the surface requiring the reinforcement.

Advantageous Effects of Invention

According to the first aspect of the invention, a stepped portion which has a low protruding height is a part of the reinforcement portion which is provided to protrude from the seat back frame. Thus, it is possible to provide a necessary stiffness to the seat back frame compared to a case where the stepped portion is not formed at all.

Furthermore, the stepped portion enables generating a gap between the member inserted into the seat back and the reinforcement portion. Thus, since the noise caused by the contact between the inserted member and the reinforcement portion is not generated, the passenger can continue to be seated comfortably.

Since the gap is generated between the inserted member and the reinforcement portion, the seat design can have a flexibility within a range allowed by the gap, and it is possible to contribute to the reduction in size of the vehicle seat.

As for the other respects, the formation position and the angle of the insertion hole of the member can also be changed within the range allowed by the gap.

Accordingly, it is possible to avoid spoiling the high freedom degree of the design while providing a necessary stiffness to the seat back frame.

According to the second aspect of the invention, the circular reinforcement portion enables resisting the bending stress acting on the seat back frame from various directions, and thus contribute to the improvement of stiffness of the seat back frame.

According to the third aspect of the invention, since a case of using a plurality of members to be inserted into the seat back can also be treated, it is possible to further enhance the freedom degree of the seat design.

According to the fourth aspect of the invention, even if the pillars are inserted to a same depth as a conventional depth, a gap for the amount of the difference in height between the stepped portion and the other portion is generated between the pillars and the reinforcement portion (stepped portion). Thus, it is possible to suppress the contact between the pillar ends and the reinforcement portion. As a result, the noise caused by the contact between the pillars and the reinforcement portion is not generated, and the passenger can be seated comfortably.

Furthermore, it is not necessary to increase the size of the seat back to separate the pillars and the reinforcement portion.

According to the fifth aspect of the invention, the pillars are separated from the ends of the stepped portion, that is, the ends of the other portion higher than the stepped portion. Thus, it is possible to suppress the contact between the ends of pillars and the reinforcement portion when the pillars vibrate in the extending direction of the reinforcement portion.

According to the sixth aspect of the invention, the stepped portion is suppressed to be the minimum length required for preventing the contact between the pillars and the reinforcement portion. Thus, it is possible to suppress the excess reduction in the stiffness of the seat back frame.

According to the seventh aspect of the invention, since the distance from the pillar supporting portion is larger than the distance in a case where a stepped portion has the same thickness as the other portion and has the protruding height lower than the other portion, it is possible to further suppress the contact between the pillar ends and the reinforcement portion.

It is not necessary to increase the size of the seat back in order to separate the pillars and the reinforcement portion.

According to the eighth aspect of the invention, since the stiffness for the amount of reduction by the stepped portion is compensated by the other reinforcement portion, it is easy to maintain the stiffness of the seat back frame to a predetermined stiffness or more.

According to the ninth aspect of the invention, since the reinforcement portion is not protruding to the back surface side of the seat back frame, it is possible to suppress the increase in thickness of the seat back toward the back surface side.

According to the tenth aspect of the invention, the reinforcement portion is formed by merely molding the seat back frame. Thus, it is possible to easily provide the reinforcement portion compared to a case of providing the reinforcement portion by joining another member.

Since another member is not used, it is possible to suppress the increase in weight of the seat back frame.

According to the eleventh aspect of the invention, since the stiffness for the amount reduced by the stepped portion is compensated by the frame material, it is possible to maintain the stiffness of the seat back frame to a predetermined stiffness or more.

DESCRIPTION OF EMBODIMENTS

The present embodiment is described below with reference to the drawings. The embodiments below include various technical limitations preferable to implement the embodiment, however, the scope of the present invention is not limited by the embodiments below or the illustrated examples.

(Vehicle Seat)

Figure 1:
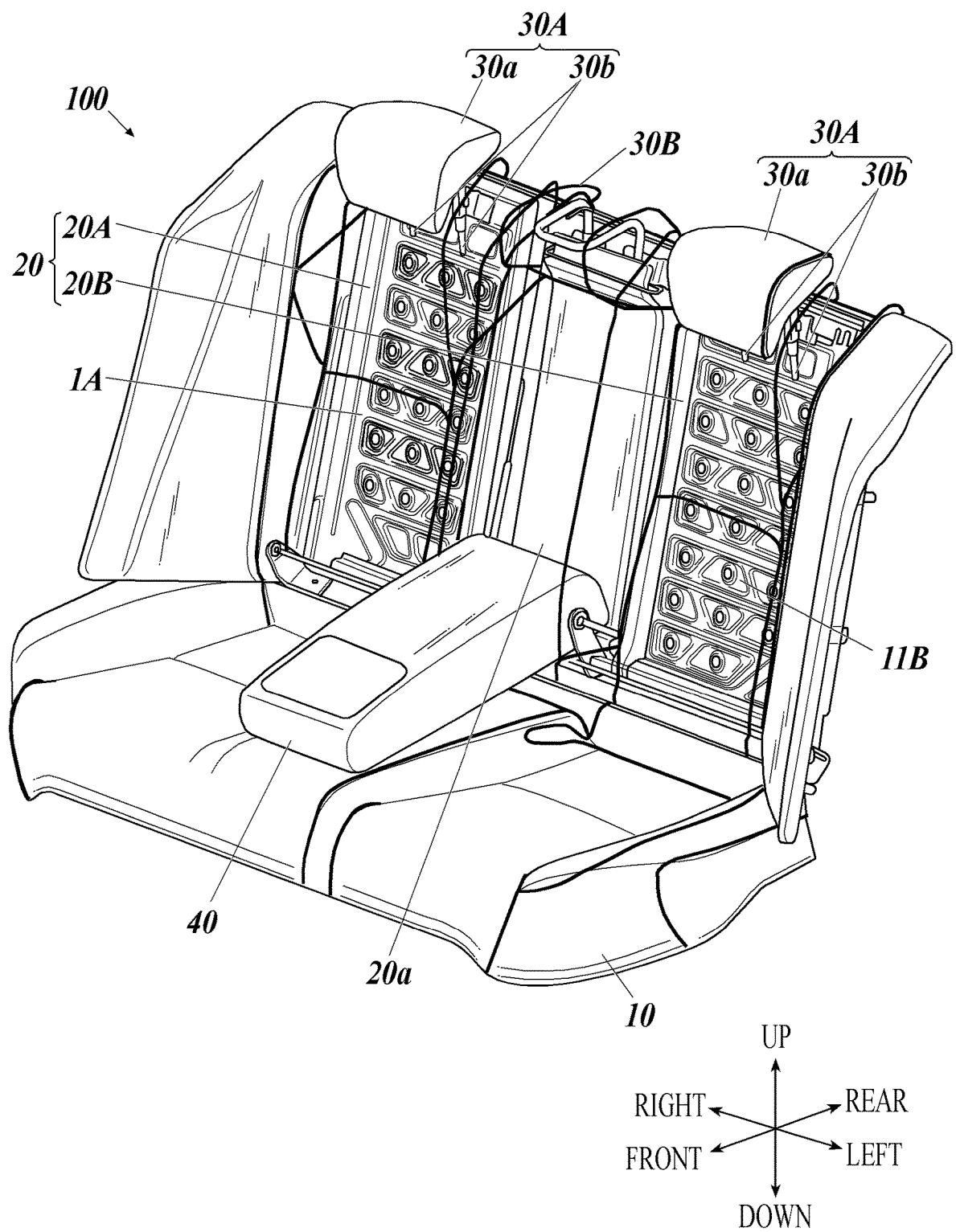
FIG. 1 is a perspective view of a vehicle seat according to an embodiment of the present invention.

First, the schematic configuration of a vehicle seat 100 according to the embodiment will be described. FIG. 1 is a perspective view of the vehicle seat 100 (for explanation, a part of the configuration is shown to be transparent for convenience).

In the description below, positions and directions are described as seen from a passenger seated in the vehicle seat, that is, according to the arrows of front, rear, left, right, up and down shown in the drawings.

As shown in FIG. 1, the vehicle seat 100 includes a seat cushion 10, a seat back 20, a plurality of head rests 30A, 30B, an arm rest 40, and the like.

Though FIG. 1 shows a seat for a car, the present invention can also be applied to seats for other automobiles such as a bus and a truck, and applied to seats for vehicles other than the automobiles such as a railroad car, a ship, and an air craft.

Though FIG. 1 shows a rear seat for a plurality of passengers, the present invention can also be applied to a seat for a single passenger.

The seat cushion 10 supports the buttocks of the passenger, and is attached to a floor of the space inside a car not shown in the drawings.

The seat cushion 10 includes a seat cushion frame not shown in the drawings, a pad covering the seat cushion frame, an outer material covering the pad, and the like.

The lower end of the seat back 20 is supported by an axis rod which is provided to extend in the horizontal direction (car width direction) at the rear end of the seat cushion 10. The seat back 20 can be rotated around the axis rod as the center of rotation by releasing the lock not shown in the drawings. That is, the seat back 20 can stand as shown in FIG. 1, and can be laid so that the front surface (surface contacting the back of the passenger) faces the seat surface of the seat cushion 10.

The seat back 20 is configured by including a first seat back 20A forming a central portion and a right side portion, and a second seat back 20B forming a left side portion. Each of them can be rotated independently.

The first seat back 20A includes a first seat back frame 1A, a pad, an outer material, and the like.

A pair of insertion holes not shown in the drawings for attaching the head rest 30A are formed on the upper portion of the right side portion of the first seat back 20A.

A concave portion 20*a* for containing the arm rest 40 is formed on the left side portion of the first seat back 20A (central portion of the seat back 20), and a fixed-type central head rest 30B is provided above.

The first seat back frame 1A is a flat plate member which is a frame of the first seat back 20A, and arranged substantially in parallel with the front surface of the first seat back 20A, in the first seat back 20A.

The details of the first seat back frame 1A will be described later.

The pad is formed by foaming a urethane resin into a shape of a sheet, and provided to the seat back frame 1A to wrap the first seat back frame 1A from the front side of the first seat back frame 1A.

The outer material covers the seat back frame 1A and the pad.

The second seat back 20B includes a second seat back frame 1B, a pad, an outer material, and the like, similarly to the first seat back 20A.

The second seat back frame 1B is a flat plate member which is a frame of the second seat back 20B, and arranged substantially in parallel with the front surface of the second seat back 20B, in the second seat back 20B.

The second seat back frame 1B has a structure substantially similar to the structure which is horizontally symmetrical to only the right side portion in the first seat back frame 1A. Thus, the explanation of the details of the second seat back frame 1B will be omitted by the explanation of the details of the first seat back frame 1A to be described later.

Each of the head rests 30A includes a head rest main body 30*a* and a pair of pillars 30*b*.

The head rest main body 30*a* includes a pad formed by foaming a urethane resin, and an outer material.

A pair of pillars 30*b* are members in a shape of rods, and protrude from the surface of the head rest main body 30*a* to extend in parallel having a same interval as the interval of the above-mentioned pair of insertion holes.

Each of the head rests 30A is attached to the seat back 20 by inserting the pair of pillars 30*b* into the respective insertion holes provided in the upper portion of the seat back 20. A stopper member not shown in the drawings is provided around each of the inlets of the insertion holes, and thus it is possible to stop the pillars 30*b* in a state in which the pillars 30*b* are inserted to a desired length (the head rest main body 30*a* is at a desired height).

The arm rest 40 is a member formed in a cuboid. One end in the longitudinal direction of the arm rest 40 is supported by an axis rod provided to extend in the horizontal direction in the lower portion of the concave portion 20*a* of the seat back 20, and the arm rest 40 can be rotated around the axis rod as the center of the rotation. That is, the arm rest 40 can stand to be contained in the concave portion 20*a*, and can be laid such that the other end in the longitudinal direction contacts the seat surface of the seat cushion 10 as shown in FIG. 1.

(Seat Back Frame)

Figure 2:
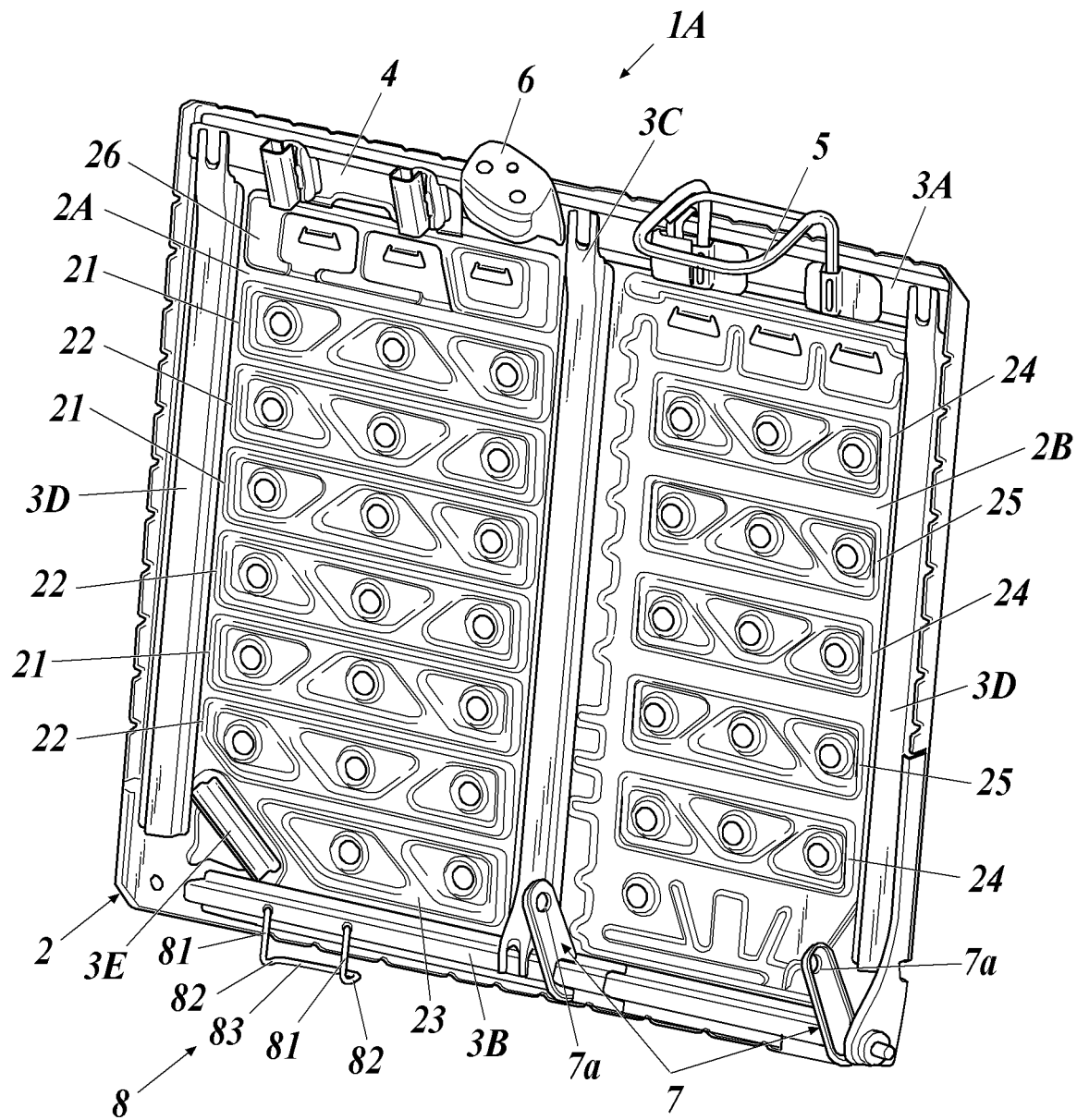
FIG. 2 is a perspective view of a seat back frame forming the vehicle seat in FIG. 1.
Figure 2:
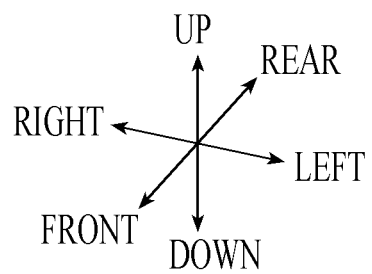
Figure 3:
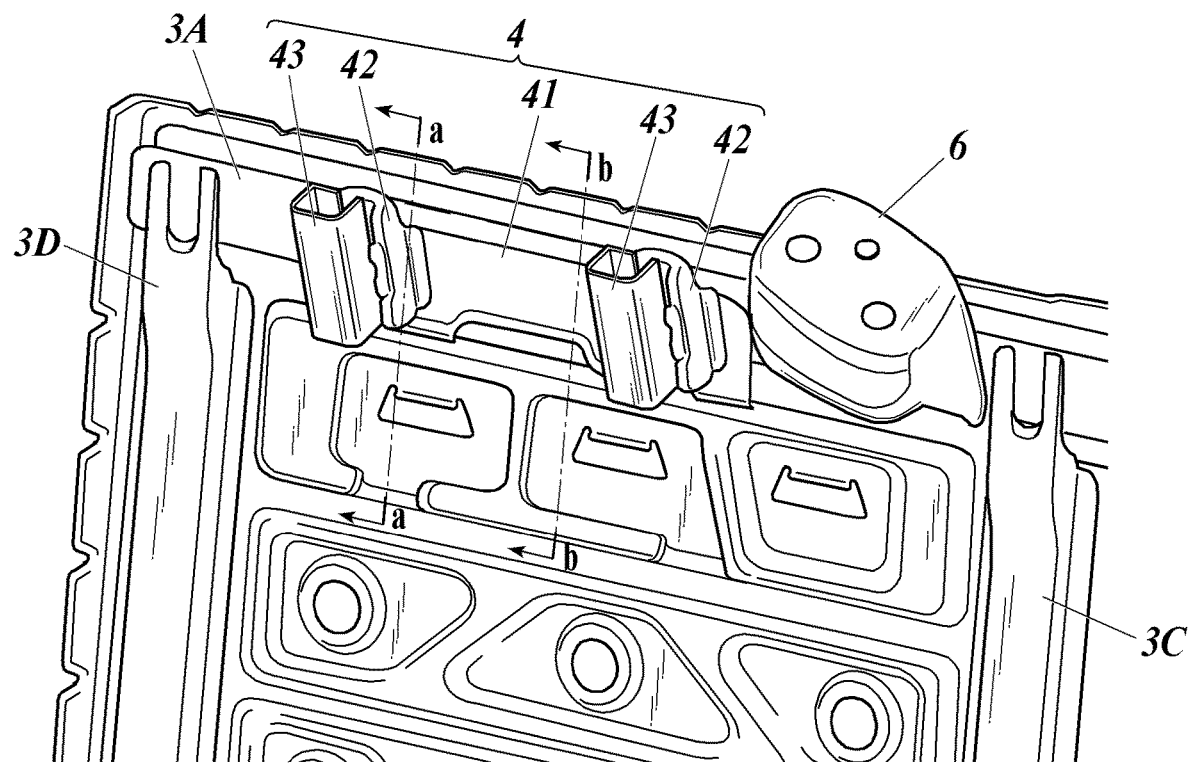
FIG. 3 is a perspective view enlarging a part of the seat back frame in FIG. 2.
Figure 3:
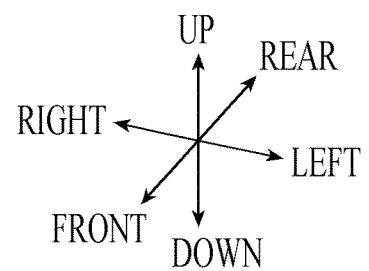
Figure 4A:
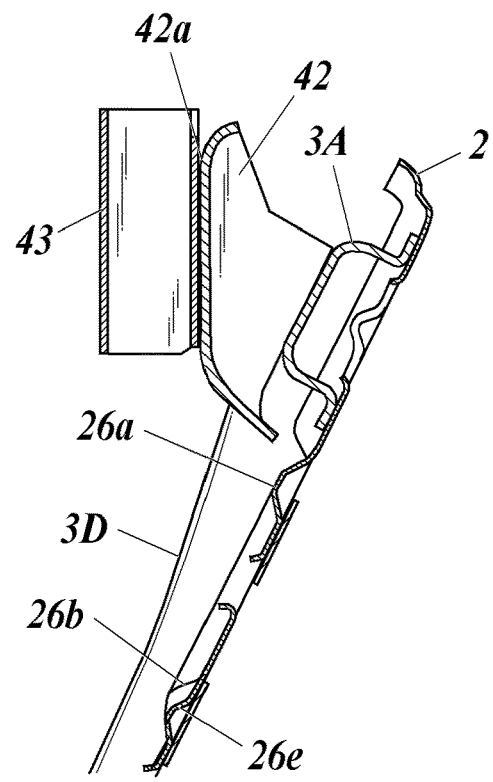
FIG. 4A is an a-a sectional view of FIG. 3.
Figure 4B:
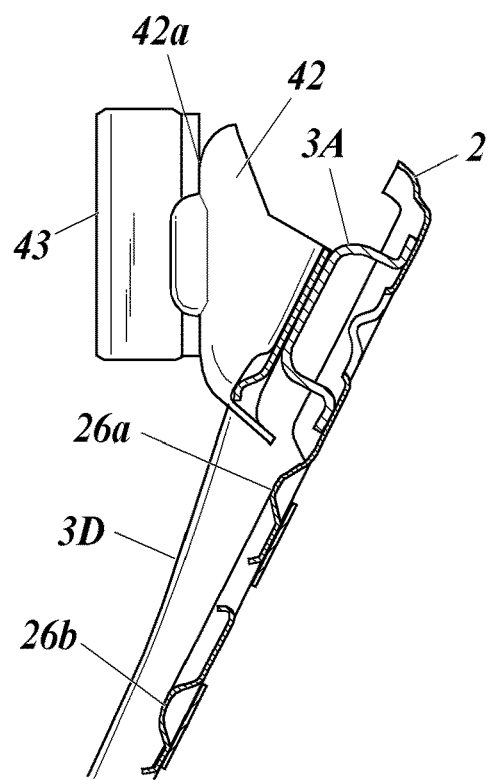
FIG. 4B is a b-b sectional view of FIG. 3.

Next, the specific configuration of the first seat back frame 1A forming the first seat back 20A will be described. FIG. 2 is a perspective view of the first seat back frame 1A, FIG. 3 is a perspective view enlarging a part of FIG. 2, FIG. 4A is an a-a sectional view of FIG. 3, and FIG. 4B is a b-b sectional view of FIG. 3.

As shown in FIG. 2, the first seat back frame 1A includes a panel material 2, a plurality of frame materials 3A to 3E, a head rest supporting portion 4, central head rest pillars 5, a seat belt guide member bracket 6, a pair of arm rest brackets 7, a clip protecting portion 8, and the like.

The panel material 2 is a metal such as a steel or an aluminum alloy and is formed to be in a substantially flat shape in a rectangular shape from a front view.

The peripheral of the panel material 2 is bent toward the front side (direction in which the surface requiring reinforcement is directed) over the substantially entire circumference. That is, the entire shape of the panel material 2 is a tray shape.

The plurality of frame materials 3A to 3E are members formed of metal such as a steel or an aluminum alloy in a shape of rods. All of the frame materials 3A to 3E are welded to the front surface of the panel material 2 (surface requiring reinforcement).

Among them, the upper frame material 3A is arranged in the upper end of the panel material 2 to extend along the upper edge of the panel material 2.

The lower frame material 3B is arranged in the lower end of the panel material 2 to extend along the lower edge of the panel material 2.

The middle frame material 3C is arranged through the central portion of the panel material 2, to extend in parallel with the lateral edges of the panel material 2.

The pair of lateral frame materials 3D are respectively arranged in the left and right lateral end portions of the panel material 2 to extend along the lateral edges of the panel material 2.

The corner frame material 3E is arranged in the lower right portion of the panel material 2 to extend with an angle (approximately 45 degrees) with respect to the lower edge or the right edge of the panel material 2.

By arranging a plurality of frame materials 3A to 3E in such a way, the panel material 2 includes two regions in the left and right surrounded by the frame materials 3A to 3E. Hereinafter, in the panel material 2, the region between the middle frame material 3C and the right lateral frame material 3D is referred to as a right side region 2A, and the region between the middle frame material 3C and the left lateral frame material 3D is referred to as a central region 2B.

The two regions 2A and 2B have a plurality of reinforcement regions 21 to 26 for enhancing the stiffness of the panel material 2.

The details of these reinforcement regions 21 to 26 will be described later.

The head rest supporting portion 4 is provided on the front surface of the portion of the right side region 2A side in the upper frame material 3A. As shown in FIG. 3, the head rest supporting portion 4 includes a joining portion 41, a pair of brackets 42 and a pair of pillar supporting portions 43.

The joining portion 41 is formed to be a plate extending in the horizontal direction (extending direction of the upper frame material 3A), and welded to the front surface of the upper frame material 3A.

The pair of brackets 42 are provided to the left and right ends of the joining portion 41 to protrude toward the front side. The front surface 42a of each of the brackets 42 has an angle with respect to the front surface of the panel material 2 when seen from the horizontal direction, as shown in FIGS. 4A and 4B. In detail, the front surface 42a of the bracket 42 is tilted such that the lower portion in the front surface 42a is closer to the panel material 2.

Each of the pillar supporting portions 43 is a cylindrical member with both ends open and is hollow in a substantially vertical direction, and the lateral surface of the pillar supporting portion 43 is welded to the front surface 42a of the bracket 42.

As mentioned above, since the front surface 42a of the bracket 42 is tilted toward to front surface of the panel material 2, the hollow direction of the pillar supporting portion 43 to be welded to the front surface 42a is also tilted toward the front surface of the panel material 2.

A cylindrical pillar holding member 31 (see FIGS. 5 and 6) is attached to each of the pillar supporting portions 43 such that the pillar holding member 31 is inserted into the pillar supporting portion 43. The pillar holding member 31 is a cylindrical member forming a part of the insertion hole of the pillar 30b in the first seat back 20A, and the pillar supporting portion 43 becomes penetrated in a substantially vertical direction when the pillar holding member 31 is attached to the pillar supporting portion 43.

When a pair of pillars 30b of the head rest 30A are respectively inserted into a pair of insertion holes of the first seat back 20A, the pillars 30b are inserted in the pillar holding members 31.

The central head rest pillar 5 is fixed to the upper portion of the central region 2B in the panel material 2, as shown in FIG. 2.

The pad is attached to cover the central head rest pillar 5 to form the above-mentioned central head rest 30B.

The seat belt guide member bracket 6 is welded to the lateral side of the head rest supporting portion 4 in the upper frame material 3A.

A seat belt guide member (not shown in the drawings) formed of a resin, for example, is attached to the seat belt guide member bracket 6. A seat belt not shown in the drawings is inserted in the seat belt guide member.

The pair of arm rest brackets 7 is a member which supports the above-mentioned arm rest 40 to be rotatable. The pair of arm rest brackets 7 is welded to the portions on the central region 2B side in the lower frame material 3B.

Both of the arm rest brackets 7 are provided to extend in parallel with each other, diagonally forward and upward with an interval of an approximately same degree as the width in the horizontal direction (short direction) of the above-mentioned arm rest 40.

The ends of the respective arm rest brackets 7 have axis holes 7a for inserting the axis rod which supports the arm rest 40, the axis holes 7a being formed to face each other.

The clip protecting portion 8 is formed of a wire material, and has a pair of hanging portions 81 extending downward from the lower frame material 3B, extending portions 82 extending toward the rear side from the lower ends of the respective hanging portion 81, and a horizontal portion 83 which connects the rear ends of the extending portions 82 to each other.

For example, a clip (not shown in the drawings) for supporting, to the panel material 2, a wiring extending from an electrical structure (heater or the like) which is not shown in the drawings and provided in the seat back 20 or a harness of the vehicle side connected to the wiring is arranged in the front side of the horizontal portion 83 between the pair of hanging portions 81 in the lower end of the panel material 2. Thereby, the clip can be protected from the shock from the rear side.

(Reinforcement Region)

Figure 5:
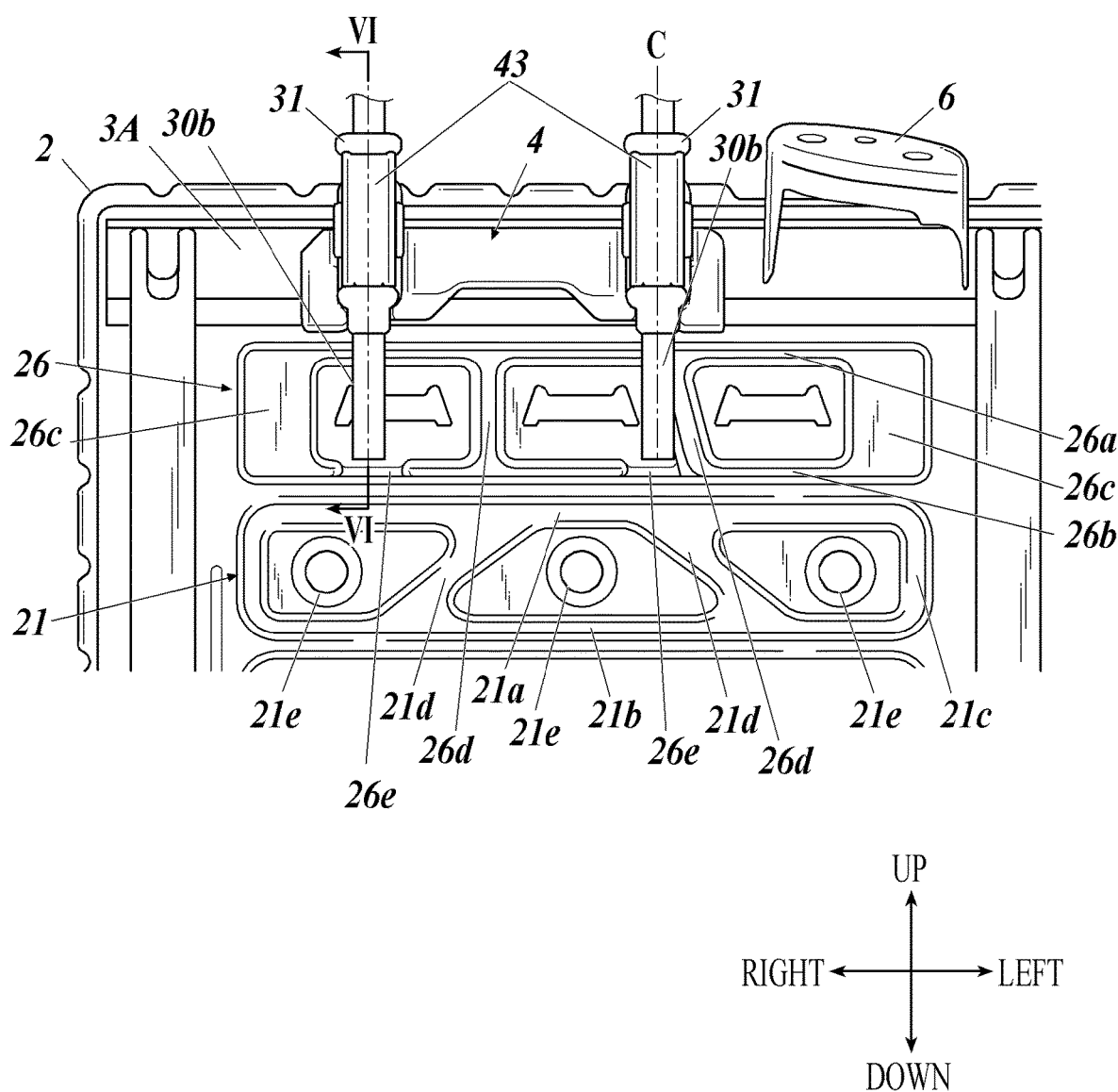
FIG. 5 is a front view enlarging a part of the seat back frame in FIG. 2 to which members are inserted.
Figure 6:
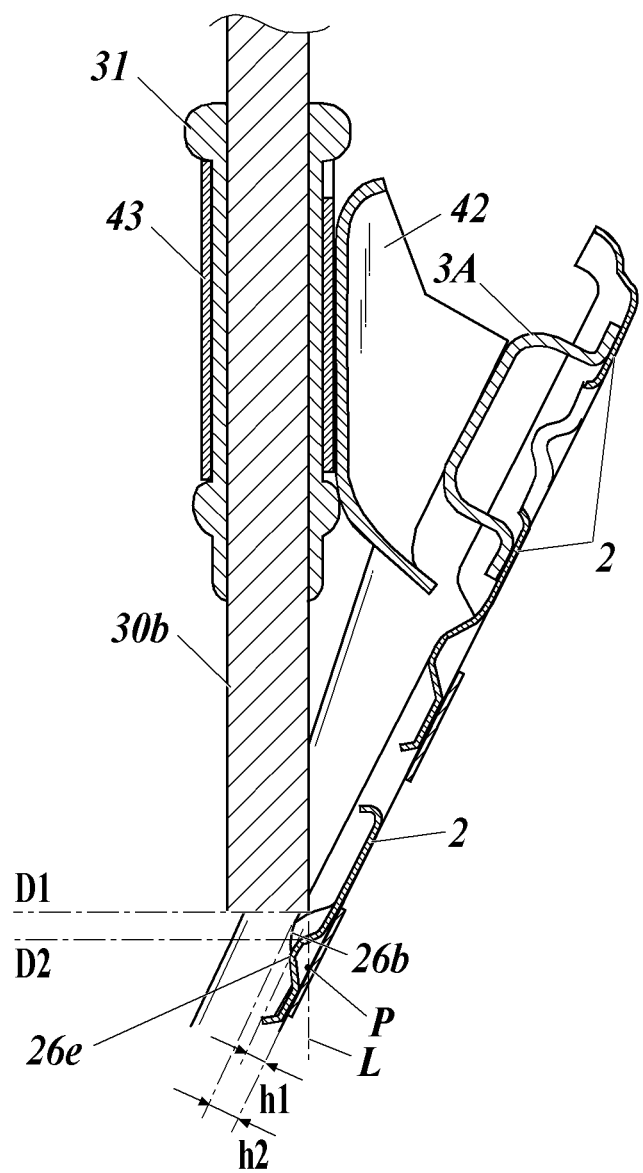
FIG. 6 is a VI-VI sectional view of FIG. 5.

Next, the details of the reinforcement regions 21 to 26 formed on the panel material 2 will be described. FIG. 5 is a front view enlarging a part of the first seat back frame 1A and a part of the pillars 30b. FIG. 6 is a VI-VI sectional view of FIG. 5.

As shown in FIG. 2, in the right side region 2A and the central region 2B of the panel material 2, a plurality of reinforcement regions 21 to 26 are provided to be arrayed in the vertical direction. In detail, the first reinforcement regions 21 and the second reinforcement regions 22 are provided to be alternately arrayed in the right side region 2A, and the fourth reinforcement regions 24 and the fifth reinforcement regions 25 are provided to be alternately arrayed in the central region 2B.

Each of the reinforcement regions 21 to 26 is formed of a plurality of reinforcement portions protruding, in a shape of lines along the front surface, from the front surface (surface requiring reinforcement). By forming grooves in the back surface of the panel material 2 by molding, the reinforcement portions in the embodiment are beads (projections) with the front surface of the panel material 2 bulging out in a shape of lines. Thus, the stiffness of the panel material 2 is enhanced, and the panel material 2 is not easily bent.

Instead of the beads, the reinforcement portions may be ribs or the like joined to the front surface of the panel material 2.

As shown in FIG. 5, the first reinforcement region 21 is formed by six reinforcement portions 21a to 21d. In detail, the upper reinforcement portion 21a, the lower reinforcement portion 21b, and a pair of lateral reinforcement portions 21c are arranged in a substantially rectangle, the upper reinforcement portion 21a extending in the horizontal direction along the upper end of the first reinforcement region 21, the lower reinforcement portion 21b extending in parallel with the upper reinforcement portion 21a along the lower end of the first reinforcement region 21, and the lateral reinforcement portions 21c extending vertically to connect both ends of the upper reinforcement portion 21a and both ends of the lower reinforcement portion 21b.

The pair of middle reinforcement portions 21d are arranged to connect the middle portion of the upper reinforcement portion 21a and the middle portion of the lower reinforcement portion 21b. The middle reinforcement portions 21d are tilted such that lower portions of the middle reinforcement portions 21d are located farther away from each other while having a space from each of the other middle reinforcement portion 21d and the lateral reinforcement portions 21c.

The first reinforcement region 21 formed in such a way is in a horizontally symmetrical shape with respect to a straight line running in the vertical direction through the center.

Each adjacent reinforcement portions are smoothly linked to each other. That is, the reinforcement portions 21a to 21c arranged in a substantially rectangle are circular.

Holes 21e for weight saving are respectively formed in the substantially trapezoid regions surrounded by the reinforcement portions 21a to 21d in the first reinforcement region 21.

As shown in FIG. 2, in the second reinforcement region 22, the pattern shape formed by a plurality of reinforcement portions and a plurality of sub-reinforcement portions is the shape vertically inverting the pattern shape of the first reinforcement region 21. That is, the second reinforcement region 22 is the pattern shape which is symmetrical with respect to the border line along the horizontal direction between the second reinforcement region 22 and the adjacent first reinforcement region 21.

Since the third reinforcement region 23 is located lowermost in the right side region 2A, in order to avoid the interference of the corner frame material 3E provided in the lower left corner of the panel material 2, the length in the horizontal direction of the third reinforcement region 23 is made shorter than the first reinforcement region 21, and the lateral reinforcement portion on the right side is formed to be tilted to form a substantially trapezoid shape.

As shown in FIG. 2, the fourth reinforcement region 24 provided in the central region 2B is in a form horizontally reducing the above-mentioned second reinforcement region 22.

The fifth reinforcement region 25 is in a form horizontally reducing the above-mentioned first reinforcement region 21.

The sixth reinforcement region 26 is provided between the upper frame material 3A and the uppermost second reinforcement region 21 in the right side region 2A.

As shown in FIG. 5, the sixth reinforcement region 26 is formed of six reinforcement portions 26a to 26d.

In detail, the upper reinforcement portion 26a, the lower reinforcement portion 26b, and a pair of lateral reinforcement portions 26c are arranged in a substantially rectangle, the upper reinforcement portion 26a extending in the horizontal direction along the upper end of the sixth reinforcement region 26, the lower reinforcement portion 26b extending in parallel with the upper reinforcement portion 26a along the lower end of the sixth reinforcement region 26, and the lateral reinforcement portions 26c extending vertically to connect both ends of the upper reinforcement portion 26a and both ends of the lower reinforcement portion 26b.

The pair of middle reinforcement portions 26d are arranged to connect the middle portion of the upper reinforcement portion 21a and the middle portion of the lower reinforcement portion 21b. The middle reinforcement portions 21d are arranged to have a space from each of the other middle reinforcement portion 21d and the lateral reinforcement portions 21c.

Each of the lateral reinforcement portions 26c is formed to be thick in the width in the horizontal direction compared to the lateral reinforcement portions of the other reinforcement regions 21 to 25.

The left-side middle reinforcement portion 26d among a pair of middle reinforcement portion 26d is provided to be located between the pair of pillar supporting portions 43 of the head rest supporting portion 4 as shown in FIG. 5.

The right-side middle reinforcement portion 26d is provided such that the upper end is located substantially directly below the pillar supporting portion 43 and the lower end is located in the left side of the pillar supporting portion 43. That is, the left-side middle reinforcement portion 26d is tilted so that the lower end is not located directly below the pillar supporting portion 43.

As shown in FIGS. 5 and 6, the lower reinforcement portion 26b is located at a position facing the end surfaces of the pillars 30b supported by the pillar supporting portions 43. In detail, as shown in FIG. 6, the lower reinforcement portion 26b is provided to extend in the horizontal direction (direction orthogonal to the drawing sheet of FIG. 6) through the intersection P between the panel material 2 and the straight line L obtained by extending the end of the pillar 30b on the panel material 2 side in the axis direction of the pillar 30b.

The portion located below each of the pair of pillar supporting portions 43 in the lower reinforcement portion 26b is lower in the protruding height than the other portion. In detail, as shown in FIG. 6, the height (distance h1 from the surface not forming the reinforcement portion in the panel material 2 to the end in the protruding direction) is lower than the distance h2 from the surface not forming the reinforcement portion to the end in the protruding direction in the other portion of the lower reinforcement portion 26b. Hereinafter, the portion lower than the other portion in the lower reinforcement portion 26b is referred to as a stepped portion 26e.

The stepped portion 26e is not only lower than the other portion, as shown in FIGS. 3 to 6, the width in the vertical direction (direction orthogonal to the extending direction of the lower reinforcement portion 26b and the protruding direction) is thinner than the other portion. The lower end of the stepped portion 26e is aligned with the other portion of the lower reinforcement portion 26b. That is, the upper end of the stepped portion 26e is located lower than the upper end of the other portion.

As shown in FIG. 5, the width in the horizontal direction of each of the stepped portions 26e is approximately the same degree as the width (thickness) in the horizontal direction of the pillar supporting portion 43 in the head rest 30A, that is, longer than the thickness of the pillar 30b. The ends of each of the stepped portions 26e in the extending direction of the stepped portion 26e are located on a side farther away from the central axis C of the pillar than both lateral surfaces of the pillar 30b supported by the pillar supporting portion 43.

The lower reinforcement portion 26b having such stepped portions 26e is located directly above the upper reinforcement portion 21a not having the stepped portion 26e in the first reinforcement region 21. That is, near the upper reinforcement portion 21a in the first reinforcement region 21, the lower reinforcement portion 26b is provided to extend in parallel with the upper reinforcement portion 21a.

In conventional techniques, when the pillar 30b is inserted to the depth shown by D1 in FIG. 6, the end of the pillar 30b and the lower reinforcement portion 26b contact each other. Thus, when the vehicle moves, the pillar 30b and the lower reinforcement portion 26b repeatedly separate from and collide with each other, and rub to generate the noise, which has made passengers feel unpleasant.

However, in the vehicle seat 100 according to the embodiment configured as mentioned above, since the stepped portion 26e which has the lower protruding height is a part of the lower reinforcement portion 26b provided to protrude from the first seat back frame 1A, it is possible to provide the necessary stiffness to the first seat back frame 1A compared with a case where the stepped portion 26e is not formed at all.

Furthermore, the stepped portion 26e enables to generate a gap between the pillar 30b inserted into the first seat back 20A and the lower reinforcement portion 26b. Thus, since the noise caused by the contact between the pillar 30b and the lower reinforcement portion 26b is not generated, the passenger can continue to be seated comfortably.

Since the gap is generated between the pillar 30b and the lower reinforcement portion 26b, the seat design can have a flexibility within a range allowed by the gap, and it is possible to contribute to the reduction in size of the vehicle seat 100.

As for the other respects, the formation position and the angle of the insertion hole of the member can also be changed within the range allowed by the gap.

Accordingly, it is possible to avoid spoiling the high freedom degree of the design while providing a necessary stiffness to the first seat back frame 1A.

In the vehicle seat 100 according to the embodiment, a shape of the lower reinforcement portion 26b having the stepped portion 26e is circular when the lower reinforcement portion 26b is seen from a direction orthogonal to the front surface of the first seat back frame 1A.

The circular reinforcement portion enables resisting the bending stress acting on the seat back frame from various directions, and thus contribute to the improvement of stiffness of the seat back frame.

In the vehicle seat 100 according to the embodiment, a plurality of the stepped portions 26e is provided.

Thus, since a case of using a plurality of members to be inserted into the first seat back 20A can also be treated as in the case of the pair of pillars 30b in the head rest 30A, it is possible to further enhance the freedom degree of the seat design.

The vehicle seat 100 according to the embodiment includes a head rest 30A that has a head rest main body 30a and pillars 30b in a shape of rods protruding from the head rest main body 30a. The pillar supporting portions 43 that support the pillars 30b are provided to the front surface of the first seat back frame 1A, and the stepped portions 26e are provided at positions facing an end of the pillars 30b supported by the pillar supporting portions 43.

Thus, even if the pillars 30b are inserted to the same depth as the conventional depth, a gap for the amount of the difference in height between the stepped portion 26e and the other portion is generated between the pillars 30b and the stepped portions 26e. Thus, it is possible to suppress the contact between the ends of the pillars 30b and the lower reinforcement portion 26b. As a result, the noise caused by the contact between the pillars 30b and the lower reinforcement portion 26b is not generated, and the passenger can be seated comfortably.

Furthermore, it is not necessary to increase the size of the first seat back 20A to separate the pillars 30b and the lower reinforcement portion 26b.

In the vehicle seat 100 according to the embodiment, the pillar supporting portion 43 is a cylinder in which the pillar 30b can be inserted. The length of the stepped portion 26e in an extending direction of the lower reinforcement portion 26b is longer than a thickness of the pillar, and both ends of the stepped portion 26e in the extending direction of the lower reinforcement portion 26b are provided on respective sides farther away from a central axis C of the pillar 30b than lateral surfaces of the pillar 30b supported by the pillar supporting portion 43.

Thus, the pillars 30b are separated from the ends of the stepped portion 26e, that is, the ends of the other portion higher than the stepped portion 26e. Thus, it is possible to suppress the contact between the ends of pillars 30b and the lower reinforcement portion 26b when the pillars 30b vibrate in the extending direction of the lower reinforcement portion 26b.

In the vehicle seat 100 according to the embodiment, the width of the stepped portion 26e in an extending direction of the lower reinforcement portion 26b is substantially equal to a width of the pillar supporting portion 43 in the extending direction of the lower reinforcement portion 26b.

Thus, the stepped portion 26e is suppressed to be the minimum length required for preventing the contact between the pillars 30b and the lower reinforcement portion 26b. Thus, it is possible to suppress the excess reduction in the stiffness of the first seat back frame 1A.

In the vehicle seat 100 according to the embodiment, the lower reinforcement portion 26b and the stepped portion 26e are provided to extend in a horizontal direction. The pillar supporting portion 43 is provided above the stepped portion 26e, and the width of the stepped portion 26e in a direction orthogonal to the extending direction of the stepped portion 26e and the protruding direction is thinner than the other portion, and an upper end of the stepped portion 26e is located lower than an upper end of the other portion.

Thus, since the distance from the pillar supporting portion is larger than the distance between the pillar supporting portion and a stepped portion which has the same thickness as the other portion and has the protruding height lower than the other portion, it is possible to further suppress the contact between the pillar ends and the reinforcement portion.

It is not necessary to increase the size of the seat back in order to separate the pillars and the reinforcement portion.

In the vehicle seat 100 according to the embodiment, near the lower reinforcement portion 26b having the stepped portion 26e, the upper reinforcement portion 21a (another reinforcement portion) of the first reinforcement region 21 not having the stepped portion 26e is provided to extend in parallel with the lower reinforcement portion 26b.

Thus, since the stiffness for the amount of reduction by the stepped portion 26e is compensated by the upper reinforcement portion 21a, it is easy to maintain the stiffness of the first seat back frame 1A to a predetermined stiffness or more.

In the vehicle seat 100 according to the embodiment, inside the first seat back 20A, the first seat back frame 1A is arranged in substantially parallel with a surface of the first seat back 20A, the surface contacting aback of a passenger, and the reinforcement portions 21a to 21d and 26a to 26d are provided to protrude toward a side where the surface contacting the back of the passenger exists.

Thus, since the reinforcement portion is not protruding to the back surface side of the first seat back frame 1A, it is possible to suppress the increase in thickness of the first seat back 20A toward the back surface side.

In the vehicle seat 100 according to the embodiment, the reinforcement portions 21a to 21d and 26a to 26d are beads that are bulging parts of the first seat back frame 1A.

Thus, since each reinforcement portion is formed by merely molding the first seat back frame 1A, it is possible to easily provide the reinforcement portion compared to a case of providing the reinforcement portion by joining another member.

Since another member is not used, it is possible to suppress the increase in weight of the first seat back frame 1A.

In the vehicle seat 100 according to the embodiment, frame materials 3A to 3E in a shape of rods extending along the front surface (surface requiring the reinforcement) of the first seat back frame 1A are provided to the front surface.

Thus, since the stiffness for the amount of reduction by the stepped portions 26e is compensated by the frame materials 3A to 3E, it is possible to maintain the stiffness of the first seat back frame 1A to a predetermined stiffness or more.

Furthermore, in the vehicle seat 100 in the embodiment, the left-side middle reinforcement portion 26d is tilted, and the lower end is located on a lateral side of the pillar supporting portion 43.

Thus, since the left-side stepped portion 26e is formed on a portion which is not a connected portion with the middle reinforcement portion 26d in the lower reinforcement portion 26b, it is possible to secure the stiffness.

These effects can also be applied to the second seat back 20B for which the detailed explanation of the configuration is omitted.

Though the present invention has been specifically described on the basis of the embodiment, the present invention is not limited to the above embodiment, and modifications can be made within the scope of the invention.

For example, in the embodiment, stepped portions are formed in the lower reinforcement portion 26b of the sixth reinforcement region 26. However, depending on the type of the vehicle on which the vehicle seat is mounted, there can be a case where the angle between the front surface of the panel material 2 and the central axis of the pillar supporting portion 43 is different and the upper reinforcement portion 26a of the sixth reinforcement region 26 or the upper reinforcement portion 21a of the first reinforcement region 21 are located on the extended line of the pillar. In such a case, the stepped portion may be formed in the reinforcement portion located on the extended line of the pillar central axis.

In the embodiment, the stepped portions 26e are formed in the lower reinforcement portion 26b extending in the horizontal direction. However, the stepped portions may be formed in the lateral reinforcement portion 26c and the middle reinforcement portion 26d extending in the direction orthogonal to the extending direction of the lower reinforcement portion 26b.

The shape, number, and arrangement of the reinforcement regions 21 to 26 including the sixth reinforcement region 26 are not necessarily limited to the shape, number and arrangement shown in the drawings as long as the stiffness necessary for the panel material 2 can be provided.

INDUSTRIAL APPLICABILITY

The present invention can be applied to a vehicle seat.

REFERENCE SIGNS LIST 100 vehicle seat
10 seat cushion
20 seat back
20A first seat back
20a concave portion
20B second seat back 1A first seat back frame
1B second seat back frame
2 panel material
2A right side region
2B middle region
21 first reinforcement region
21a upper reinforcement portion
21b lower reinforcement portion
21c middle reinforcement portion
21d lateral reinforcement portion
21e hole
22 second reinforcement region
23 third reinforcement region
24 fourth reinforcement region
25 fifth reinforcement region
26 sixth reinforcement region
26a upper reinforcement portion
26b lower reinforcement portion
26c lateral reinforcement portion
26d middle reinforcement portion
26e stepped portion
3A upper frame material
3B lower frame material
3C middle frame material
3D lateral frame material
3E corner frame material
4 head rest supporting portion
41 joining portion
42 bracket
42a front surface
43 pillar supporting portion
5 central head rest pillar
6 seat belt guide member bracket
7 arm rest bracket
7a axis hole
8 clip protecting portion
81 hanging portion
82 extending portion
83 horizontal portion
30A head rest
30a head rest main body
30b pillar
30B central head rest
40 arm rest
C central axis

The invention claimed is:
1. A vehicle seat comprising:
a seat back in which is provided a seat back frame that is a flat plate; and
a head rest that has a main body and a plurality of pillars, each in a shape of a rod, protruding from the main body, wherein:

a reinforcement portion is provided to a surface of the seat back frame, the surface requiring reinforcement, and the reinforcement portion protrudes in a shape of a line along the surface requiring the reinforcement from the surface requiring the reinforcement, the reinforcement portion includes a plurality of stepped portions, each of which (i) is provided to continue from a portion of the reinforcement portion that is not another of the stepped portions and (ii) has a protruding height lower than a protruding height of the portion of the reinforcement portion that is not another of the stepped portions, the protruding height being a height from the surface requiring the reinforcement, and one of the stepped portions is provided separately for each of the pillars.

2. The vehicle seat according to claim 1, wherein a shape of the reinforcement portion having the plurality of stepped portions is circular when the reinforcement portion is seen from a direction orthogonal to the surface requiring the reinforcement.

3. The vehicle seat according to claim 1, wherein, near the reinforcement portion having the plurality of stepped portions, another reinforcement portion not having one of the stepped portions is provided to extend in parallel with the reinforcement portion having the plurality of stepped portions.

4. The vehicle seat according to claim 1, wherein, inside the seat back, the seat back frame is arranged substantially parallel with a surface of the seat back, the surface being adapted for contacting a back of a passenger, and the reinforcement portion is provided to protrude toward a side where the surface adapted for contacting the back of the passenger exists.

5. The vehicle seat according to claim 1, wherein the reinforcement portion is a bead that is a bulging part of the seat back frame.

6. The vehicle seat according to claim 1, wherein a frame material in a shape of a rod extending along the surface requiring the reinforcement is provided to the surface requiring the reinforcement.

7. A vehicle seat comprising:
a seat back in which is provided a seat back frame that is a flat plate; and
a head rest that has a main body and a pillar in a shape of a rod protruding from the main body, wherein:
a reinforcement portion is provided to a surface of the seat back frame, the surface requiring reinforcement, and the reinforcement portion protrudes in a shape of a line along the surface requiring the reinforcement from the surface requiring the reinforcement,
a part of the reinforcement portion is a stepped portion that (i) is provided to continue from a portion of the reinforcement portion that is not the stepped portion and (ii) has a protruding height lower than a protruding height of the portion of the reinforcement portion that is not the stepped portion, the protruding height being a height from the surface requiring the reinforcement,
a pillar supporting portion that supports the pillar is provided to the surface requiring the reinforcement,
the stepped portion is provided at a position facing an end of the pillar supported by the pillar supporting portion, and
a width of the stepped portion in an extending direction of the reinforcement portion is substantially equal to a width of the pillar supporting portion in the extending direction of the reinforcement portion.

8. The vehicle seat according to claim 7, wherein a shape of the reinforcement portion having the stepped portion is circular when the reinforcement portion is seen from a direction orthogonal to the surface requiring the reinforcement.

9. The vehicle seat according to claim 7, wherein a plurality of the stepped portions is provided.

10. The vehicle seat according to claim 7, wherein
the pillar supporting portion is a cylinder in which the pillar is inserted,
a length of the stepped portion in the extending direction of the reinforcement portion is longer than a thickness of the pillar, and
both ends of the stepped portion in the extending direction of the reinforcement portion are provided on respective sides farther away from a central axis of the pillar than lateral surfaces of the pillar supported by the pillar supporting portion.

11. The vehicle seat according to claim 10, wherein
the reinforcement portion having the stepped portion is provided to extend in a horizontal direction,
the pillar supporting portion is provided above the stepped portion,
a width of the stepped portion in a direction orthogonal to an extending direction of the stepped portion and the protruding direction is thinner than a width of the portion of the reinforcement portion that is not the stepped portion, and
an upper end of the stepped portion is located lower than an upper end of the portion of the reinforcement portion that is not the stepped portion.

12. The vehicle seat according to claim 7, wherein, near the reinforcement portion having the stepped portion, another reinforcement portion not having the stepped portion is provided to extend in parallel with the reinforcement portion having the stepped portion.

13. The vehicle seat according to claim 7, wherein, inside the seat back, the seat back frame is arranged substantially parallel with a surface of the seat back, the surface being adapted for contacting a back of a passenger, and
the reinforcement portion is provided to protrude toward a side where the surface adapted for contacting the back of the passenger exists.

14. The vehicle seat according to claim 7, wherein the reinforcement portion is a bead that is a bulging part of the seat back frame.

15. The vehicle seat according to claim 7, wherein a frame material in a shape of a rod extending along the surface requiring the reinforcement is provided to the surface requiring the reinforcement.

* * * * *